April 18, 1939.                G. K. LITSINGER                2,154,759
                    BEARING FOR HYDRAULIC TURBINE SHAFTS
                       Filed Aug. 7, 1937          2 Sheets-Sheet 2
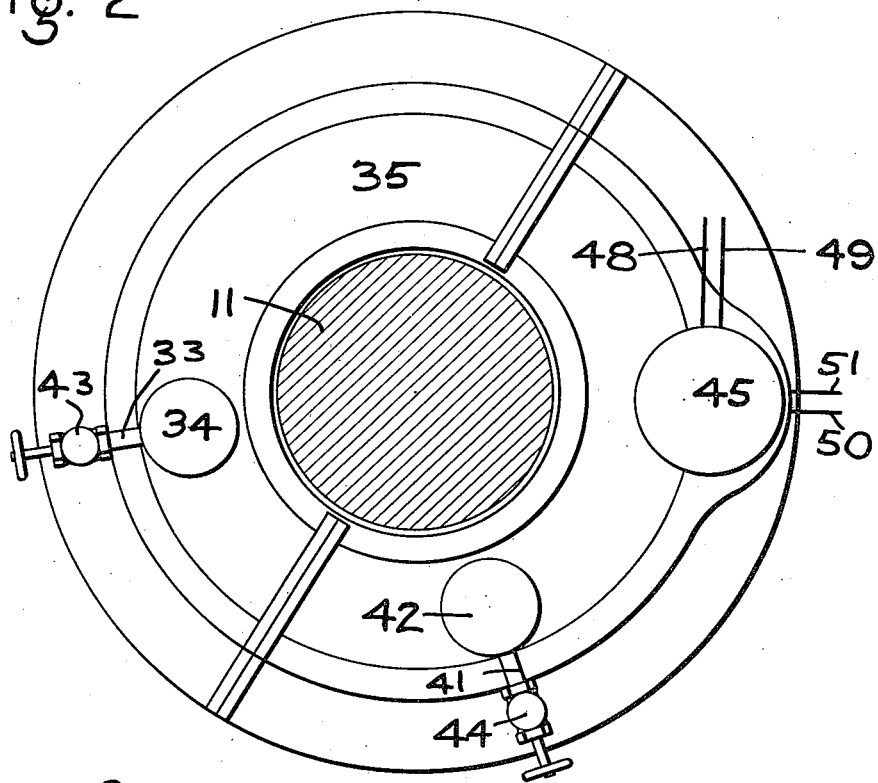
Fig. 2
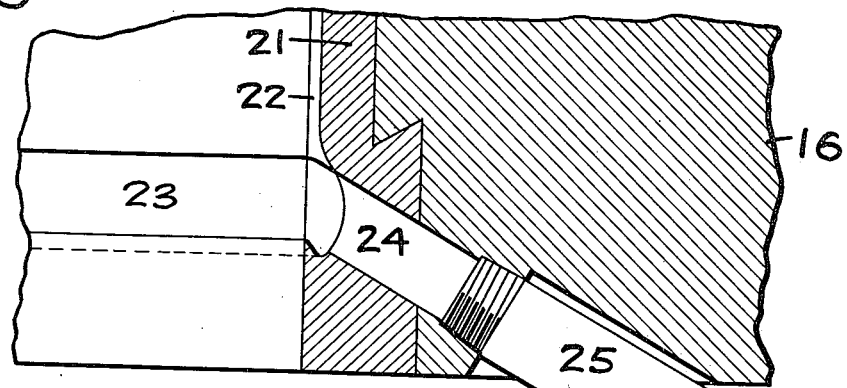
Fig. 3
Fig. 4
Inventor
GEORGE K. LITSINGER
By Malcolm F. Gannett
Attorney Patented Apr. 18, 1939

2,154,759

UNITED STATES PATENT OFFICE 2,154,759

BEARING FOR HYDRAULIC TURBINE SHAFTS

George K. Litsinger, York, Pa., assignor to S. Morgan Smith Company, York, Pa., a corporation of Pennsylvania Application August 7, 1937, Serial No. 157,823

2 Claims. (Cl. 308—121)

This invention relates to a bearing for hydraulic turbine shafts and the like and particularly to means for circulating a lubricant through the bearing.

An object of the invention is to provide an improved shaft bearing in which a predetermined quantity of lubricating oil is maintained in the upper of two oil chambers located, respectively, above and below the bearing.

Another object of the invention is to provide an improved bearing of the above type in which the lubricating oil flowing downwardly through the bearing is collected in a groove formed in the lower portion of the bearing and then conducted from the groove towards a chamber located beneath the bearing in such a manner that vaporizing of the oil is prevented.

With the foregoing and other objects and advantages in view, the invention consists in the preferred construction and arrangement of the several parts which will be hereinafter fully described and claimed.

In the accompanying drawings:—

Fig. 2 is a plan of the upper portion of the structure shown in Fig. 1, the turbine shaft being shown in section;

Fig. 3 is an enlarged section of the lower portion of the bearing; and

Fig. 4 is a detail vertical section of one of the screens for the oil delivered to the upper oil chamber.

Figure 1:
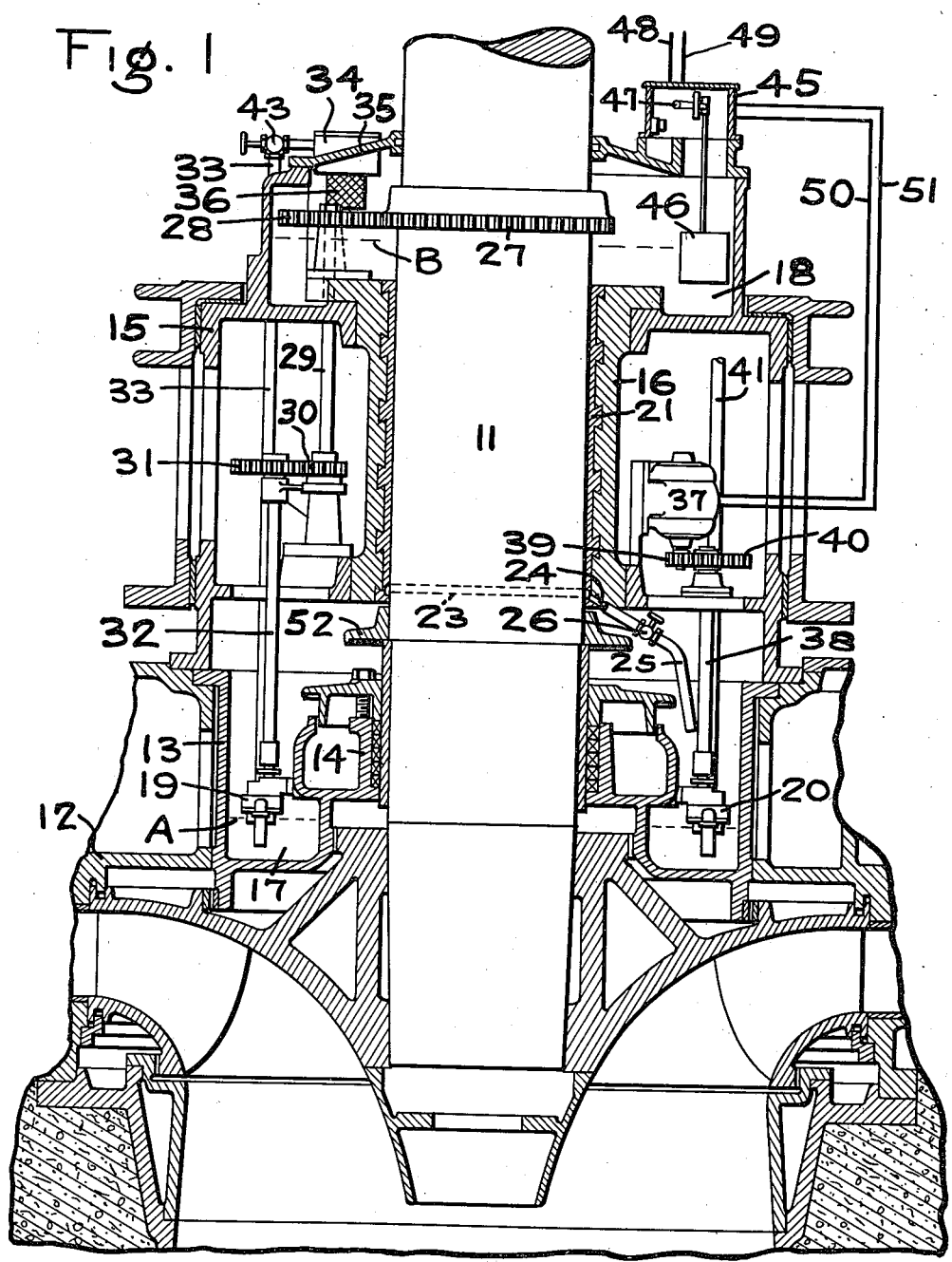
Figure 1 is a vertical section of a portion of a hydraulic turbine having a bearing constructed according to the present invention.

Referring to the drawings, and especially to Fig. 1, the improved bearing is associated with a shaft 11 of a hydraulic turbine of well-known construction, of which a portion of the top plate 12 is shown.

Supported by the top plate 12 and surrounding the shaft 11, is a housing 13 for a packing box 14, and a housing 15 for the bearing 16, the bearing being located above the packing box.

The bottom portion of the packing box housing 13 is formed with a chamber 17 which constitutes a sump in which collects lubricating oil.

The upper portion of the bearing housing 15 is formed with a chamber 18 for the lubricating oil which is supplied to the bearing 16.

Pumps 19 and 20 located in the chamber 17 are adapted to force lubricating oil from the lower sump upwardly into the oil supply chamber 18. From chamber 18 the lubricating oil is adapted to flow by gravity downwardly through the bearing 16 and around the portion of the shaft 11 enclosed by said bearing and discharge towards the lower oil chamber 17.

The bearing 16 may be of any preferred construction. In the instant case the bearing is shown as comprising an outer cylindrical shell in which is mounted an inner shell 21 formed of suitable composition bearing material.

The inner surface of the portion 21 of the bearing 16 is, as is customary, formed with grooves 22, one of which is shown in Fig. 3. These grooves serve as means for conducting the lubricating oil through the bearing, so that the revolving shaft 11 will be coated with a film of oil during operation of the turbine.

At a point adjacent the lower end of the bearing 16, an annular groove 23 is formed. The grooves 22 terminate in the groove 23 so that lubricating oil flowing downwardly through the bearing 16 collects in the groove 23.

In order to deliver lubricating oil from the bearing 16 to the lower oil reservoir provided by the chamber 17, an opening 24 is formed in the lower portion of the bearing 16. This opening leads from the groove 23. Connected to the outer end of opening 24 is a pipe 25 having installed therein a suitable valve device 26 for controlling communication through said pipe.

While in the instant case only one pipe 25 is shown, it will be understood that as many of these pipes as desired may be installed around the bearing 16 in order to control the discharge of lubricating oil from the bearing 16.

The pump 19 is adapted to operate automatically during the time the turbine is in operation, and for this purpose said pump is driven from the turbine shaft 11 by suitable gearing comprising a ring gear 27 carried by the shaft 11 and rotated thereby. The gear 27 is in meshing relationship with a gear 28 carried by the upper end of a shaft 29. The lower end of shaft 29 carries a gear 30 in meshing relationship with a gear 31 on the upper end of shaft 32 of the pump 19. In this way rotation of the turbine shaft 11 effects rotation of the pump shaft 32 so that the pump 19 is operated.

Leading from the pump 19 is a pipe 33 which is connected to a chamber 34 formed in cover plate 35 which closes the top of the upper oil chamber 18.

The bottom of chamber 34 is open, as shown in Fig. 4, and mounted therein is a screen 36 so that foreign matter which may be present in the lubricating oil pumped from the lower oil chamber 17 will be prevented from entering the upper oil chamber 18.

The normal operating levels of the lubricating oil in chambers 17 and 18 are indicated by the broken lines A and B, respectively, Fig. 1.

The pump 20 is adapted to supplement pump 19, and so that lubricating oil can be transferred from the lower oil chamber 17 to the upper oil chamber 18 when the turbine is not in operation, pump 20 is adapted to be operated by an electric motor 37 which is operatively connected to the shaft 38 of said pump by gears 39 and 40.

Pipe 41, leading from the pump 20 is connected to a chamber 42 in the cover plate 35, as shown in Fig. 2. Since chamber 42 is similar in construction to the chamber 34 heretofore described, only one of said chambers is shown in detail in the drawings.

Both oil pipes 33 and 41 have, respectively, installed therein, valve devices 43 and 44, for the purpose of controlling the flow of lubricating oil through said pipes.

Operatively associated with the electric motor 37 is a float switch device 45 which is carried by the cover plate 35.

The switch device 45 may be of any approved type. As shown, the switch device comprises electrical switch mechanism 47 which may be connected to a suitable source of electric energy by conductors 48 and 49. Electric energy is conducted from said switch device to the electric motor 37, by conductors 50 and 51.

The switch mechanism 47 is operatively associated with a vertically disposed rod of a float 46 disposed in the upper oil chamber 18, whereby when the float is maintained at a predetermined position by the amount of oil in said chamber 18 the switch mechanism 47 will be in open circuit position so that no electric energy will be supplied to the motor 37. When the level of the oil in chamber 18 decreases a predetermined amount below the normal operating level indicated at B, Fig. 1, the float 46 will be lowered an amount sufficient to permit the switch mechanism 47 to close the electric circuit so that electric energy will be supplied to the motor 37. In this way the pump 20 will be operated by the motor 37.

In operation, assuming that the hydraulic turbine is idle, the upper oil chamber 18 is maintained supplied with a predetermined quantity of lubricating oil by pump 20, through the operation of electric motor 37 under the control of the float switch device 45.

When the hydraulic turbine is in operation, oil pump 19 will be operated from shaft 11 by the gearing heretofore described, and consequently oil from the lower chamber 17 will be forced upwardly into upper chamber 18.

From upper oil chamber 18, the lubricating oil flows downwardly through the bearing 16 and collects in the annular groove 23 of said bearing. From the groove 23 the oil is discharged through pipe 25 towards the lower oil chamber 17.

If, during the operation of the turbine, the capacity of pump 19 is not sufficient to maintain oil at the desired level in the upper oil chamber 18, then the electrically operated oil pump 20 will be actuated by the motor 37 under the control of the float switch device 45 in the manner heretofore described so as to augment the circulation of oil from the lower oil chamber 17 to the upper oil chamber 18.

Heretofore, it was the practice to form the inner shells of the hydraulic turbine bearings with grooves which extended throughout the entire length of the bearings. With such construction, the lubricating oil flowed down the runner shaft and collected onto a deflector 52 carried by the shaft in spaced relation to the bottom of the bearing.

Due to centrifugal force produced by the revolving runner shaft and the deflector 52, the oil is thrown outwardly and is broken up into small particles and vapor. The heavier particles of oil settle and drain into the oil sump provided by the lower chamber 17. The vapor, however, owing to the machine windage is drawn out through the various openings in the bearing housing and eventually settles on the parts of the turbine. Some of the vapor is drawn upwardly into the electric generator mounted on the upper portion of the turbine shaft and eventually settles in the windings of the generator. In time the generator windings become saturated and there is considerable danger of electrical break down.

By the present invention, the hot lubricating oil from the bearing is directed in a stream towards the lower oil chamber 17. This method of conducting the oil from the bearing to the lower oil chamber prevents the breaking up of the oil into small particles and vapor and thus reduces oxidization. In other words, the life of the lubricating oil used for the bearing is increased considerably, since the oil is not aerated and thereby subjected to oxidization in the same manner as is vaporized oil.

Having thus described my invention, what I claim is:

1. The combination with a rotatable shaft, of a bearing surrounding the shaft, a housing surrounding said shaft and said bearing for supporting the bearing, an oil chamber in said housing beneath said bearing and disposed in spaced relation to said shaft for containing lubricating oil from said bearing, a second chamber in said housing located above said bearing for containing a supply of lubricating oil for said bearing, a pump disposed in the lower chamber, gearing operated by said shaft when the shaft is rotated for operating said pump to force oil from the lower chamber into the upper chamber, a second pump in said lower chamber, an electric motor for operating said second pump, an electric switch device for controlling the electric circuit of said motor, a float disposed in the oil in the upper oil chamber, said float having a rod operatively associated with said motor circuit switch and operable upon a predetermined decrease in the level of the oil in the upper oil chamber for operating said switch device to close the motor circuit, and means for conducting oil from said bearing to said lower chamber so that the oil is prevented from contacting with said shaft beneath the bearing.

2. The combination with a rotatable shaft, of a bearing surrounding the shaft, superposed oil chambers, one of said chambers being located beneath said bearing for containing lubricating oil discharged from the bearing and the other chamber being located above said bearing for containing lubricating oil to be supplied to the bearing by gravity, a pump in said lower chamber for forcing oil from said lower chamber into said upper chamber, gears operated by said shaft when the shaft is rotated for operating said pump, a second pump in said lower chamber for forcing oil from the lower chamber into said upper chamber, an electric motor for operating said second pump, an electric circuit having a switch device for controlling the operation of said motor, and means disposed in said upper oil chamber and operated by fluctuations of the level of the oil in the upper chamber for controlling the operation of said electric switch device.

GEORGE K. LITSINGER.